United States Patent
Lu

(10) Patent No.: US 8,170,701 B1
(45) Date of Patent: May 1, 2012

(54) METHODS AND APPARATUS OF RUNNING GAME AND RENDERING GAME AUDIO REMOTELY OVER BROADBAND NETWORK

(75) Inventor: Yang Lu, Streamwood, IL (US)

(73) Assignee: ViTie Inc.

( * ) Notice: Subject to any disclaimer, the term of this patent is extended or adjusted under 35 U.S.C. 154(b) by 1204 days.

(21) Appl. No.: 11/682,877

(22) Filed: Mar. 7, 2007

Related U.S. Application Data

(60) Provisional application No. 60/780,020, filed on Mar. 7, 2006.

(51) Int. Cl.
*G06F 17/00* (2006.01)
(52) U.S. Cl. .......................................... 700/94
(58) Field of Classification Search ...................... 700/94
See application file for complete search history.

(56) References Cited

U.S. PATENT DOCUMENTS

| | | | |
|---|---|---|---|
| 7,209,874 B2 * | 4/2007 | Salmonsen | 703/23 |
| 2006/0080702 A1 | 4/2006 | Diez | |
| 2007/0060363 A1 * | 3/2007 | Nguyen et al. | 463/42 |

* cited by examiner

*Primary Examiner* — Andrew C Flanders

(57) ABSTRACT

A system and methods for running interactive applications (e.g., video game, computer game, console game) over broadband network (e.g., IPTV network, broadband mobile network, broadband Internet, cable network, etc.). In an embodiment, interactive applications can be hosted and executed remotely by an interactive application host either natively or using emulation (e.g., virtual machine, emulation of software platform, operating system, or hardware platform). Audio of the interactive application can be rendered by one or multiple audio rendering apparatuses, compressed, transmitted over the broadband network to one or multiple clients (e.g, set-top box, media player, game console, mobile device, personal computer), and presented by the client's audio display device. In additional embodiment, said audio rendering apparatus can render multiple streams of audio for multiple clients concurrently. An audio rendering apparatus can cache the audio data shared by multiple clients or multiple instances of an interactive application to reduce bandwidth consumption. Furthermore, during audio presentation, a client synchronizes audio and video display.

19 Claims, 13 Drawing Sheets

METHODS AND APPARATUS OF RUNNING GAME AND RENDERING GAME AUDIO REMOTELY OVER BROADBAND NETWORK

This application claims the benefit of U.S. Provisional Application No. 60/780,020, filed on Mar. 7, 2006.

BACKGROUND OF THE INVENTION

1. Field of the Invention

This invention relates to video game or interactive application hosting service where audio stream of the hosted applications is rendered remotely and delivered to the clients (e.g., set-top box, console, personal computer, mobile device, etc.,) over broadband network.

2. Description of the Prior Art

The prior art of running interactive entertainment applications on widely available consumer media play devices are, specialized game consoles such as Playstation 3 or XBOX that become increasingly sophisticated and expensive to design and manufacture; interactive television that mainly designed for on-demand viewing of shows, movies, videos, etc; on-demand-game-download that downloads games or emulators on demand over broadband network to a device that will execute the downloaded game or emulator locally.

BRIEF DESCRIPTION OF THE DRAWINGS

The invention may be better understood, and further advantages and uses thereof more readily apparent, when considered in view of the following detailed description of exemplary embodiments and examples, taken with the accompanying diagrams, in which.

Figure 1:
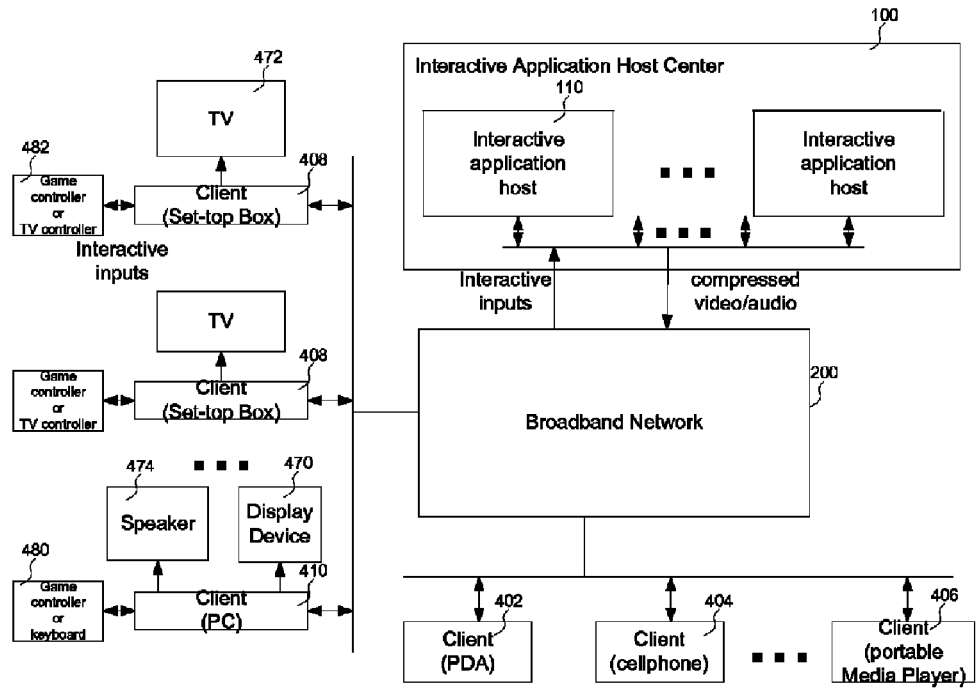
FIG. 1 is a block diagram showing, in one embodiment, components for connecting clients with an interactive application host center via broadband network.

While the patent invention shall now be described with reference to the embodiments shown in the drawings, it should be understood that the intention is not to limit the invention only to the particular embodiments shown but rather to cover alterations, modifications and equivalent arrangements possible within the scope of appended claims. Throughout this discussion that follows, it should be understood that the terms are used in the functional sense and not exclusively with reference to specific embodiment, implementation, programming interface.

DETAILED DESCRIPTION OF THE PREFERRED EMBODIMENTS

Discussion in this section is intended to provide a brief description of some exemplary embodiments of the present invention.

FIG. 1 is a block diagram showing, in one exemplary embodiment of the present invention, the system involved for connecting clients with interactive application host center (100) via broadband network (200) (e.g., IPTV network, cable network, mobile broadband network, broadband Internet). In one exemplary embodiment of the present invention, an interactive application host center comprises a collection of interactive application hosts (100) that run interactive applications (e.g., computer game, video game, console game, mobile game, interactive graphical application) remotely. In one exemplary embodiment, said interactive application host center (100) can compromise one or multiple graphics rendering apparatuses for remote graphics and video rendering or processing, or one or multiple audio rendering apparatuses for remote audio rendering or processing. In additional embodiment, said graphics rendering apparatus and said audio rendering apparatus can be combined or integrated together into one graphics-audio rendering apparatus.

Still referring to FIG. 1, an interactive application host center (100) can render frames of hosted interactive application, compress the rendered frames as compressed frames or compressed video, transmit the compressed frames or compressed video to a client over broadband network (200) (e.g., broadband Internet, IPTV network, cable network, broadband mobile network, or other similar network communications). For interactive audio, an interactive application host (110) can either directly render or simulate audio effects, or render audio through the audio rendering apparatus. The rendered audio data is compressed, transmitted to the clients over broadband network (200). The broadband network (200) can comprise the Internet, IPTV network, broadband mobile network such as 3G or 4G network, or other similar network communications. On the client side, a client can comprise television set-top box (408), or PDA device (402), or cellphone (404), or personal computer (410), or media player (406), or game console, or other similar computing device.

A client can support decompressing and displaying of the video and audio streams transmitted over the network. It can decompress the received video and audio stream from an interactive application host center (100), display or render video and audio on the attached visual-audio display device (470) (e.g., television set (472), monitor, LCD panel, speaker (474), or other similar video or audio output device). Furthermore, a video or audio output device can connect with a client via wired or wireless communications.

For supporting interactive application, a client can comprise one or multiple input devices (e.g., game pad, game controller, joystick, keyboard (480), television controller (482), other similar input device that can capture or digitize human input/locomotion/movement). An input device can connect to a client via wired or wireless communications.

In further embodiment, a client can have one or multiple input devices. For example, a set-top box (408) may have multiple game input devices connected via either wired or wireless communications. User inputs (e.g., raw user input, processed user inputs, translated user inputs, re-mapped user inputs) are transmitted to the interactive application host (110) via network communications (e.g., broadband network, mobile network, dial-up network, other similar upstream network communications).

Still referring to FIG. 1, a client can receive compressed audio stream through unicast, or multicast, or broadcast, or combination of unicast, multicast, or broadcast. In one exemplary embodiment, clients of an interactive application host center (100) can comprise unicast clients, or multicast clients, or broadcast clients, or combinations of thereof said clients.

Figure 2:
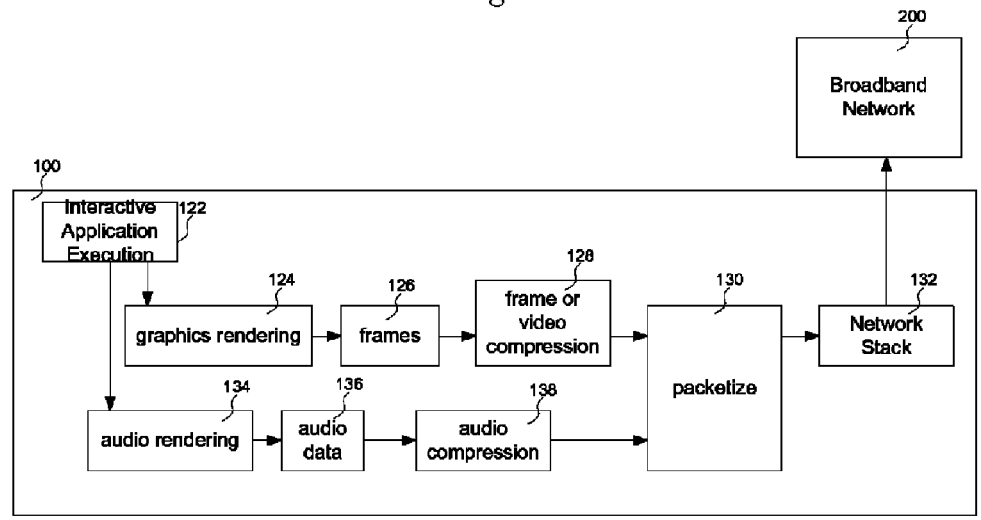
FIG. 2 is a block diagram showing, in one embodiment, components and steps for generating audio data of an interactive application by an interactive application host center.

FIG. 2 is a block diagram showing, in one exemplary embodiment of the present invention, components and steps for executing interactive application (122) by an interactive application host center (100), generating video frames (126) and audio (136) of the interactive application through graphics rendering (124) and audio rendering (134), compressing the video and audio data (128 and 138), packetizing (130) the compressed video and audio data, and transmitting the results over the network. In one embodiment, the broadband network (200) is IP based. However, it should be understood that the scope of the present invention is not limited to only IP networks.

In an embodiment, audio rendering commands (134) or audio data (136) can be processed by either the interactive application host or audio rendering apparatus. The kind of audio rendering performed by an audio rendering apparatus includes but not limited to, 3D audio effects, positional audio effects such as panning or distance attenuation, environment audio or ambient audio effects, audio mixing, audio simulation, audio convolving, spatial sound effects, audio re-sampling, reverberation effects, audio propagation effects, doppler effects, audio radiation, and other similar audio processing or simulation effect. The results of audio rendering (134) are digital audio data (136) that can be played by standard audio output device. Note that an audio rendering apparatus does not have to support all the listed functionality. An audio rendering apparatus may support one or a sub set of the mentioned audio rendering operations.

Still referring to FIG. 2, in one exemplary embodiment, the preferred steps involved for audio processing by an interactive application host center (100) comprise, audio rendering (134); compressing or encoding the rendered audio data; packetizing (130) the compressed or encoded audio data; transmitting the result packets to one or multiple clients over network. The above steps are the preferred implementation when the interactive application host center connects with the clients via IP networks.

However, in accordance with the present invention, an embodiment does not have to follow all the above steps. For example, packetizing (130)can be performed before compression or encoding. Furthermore, in additional embodiment, some of the above steps can be merged or combined or bypassed. For example, in one exemplary embodiment, an audio rendering apparatus can generate compressed or encoded audio data directly as rendering results.

In another embodiment, if the network is cable network, packetizing (130) and network stack (132) may be different. In this case, compressed video or audio can be encoded in format that is compatible with the cable transmission standard.

It should be understood that the terms or components shown in FIG. 2 are all functional. It does not mean that there must be separate independent software or hardware modules or components responsible for each step. For each component, there may exist multiple ways of embodiment or different ways to name the component.

Furthermore, an embodiment may also split functionality assigned to each step in FIG. 2 into multiple steps. Also in some embodiment, though inefficient, the compression processing can be optional. However, this would not be a preferred embodiment. Furthermore, it should be understood that the scope of the present invention is not limited by how the compressed audio stream is transmitted.

The scope of the present invention should not be restricted by, for example, using which network protocol, or using which physical transmission medium, or using what network topology, or implementation options such as whether video and audio are transmitted as separate streams or are multiplexed or are mingled together. Furthermore, audio compression can be done using any audio compression standard, or compression algorithm.

Figure 3:
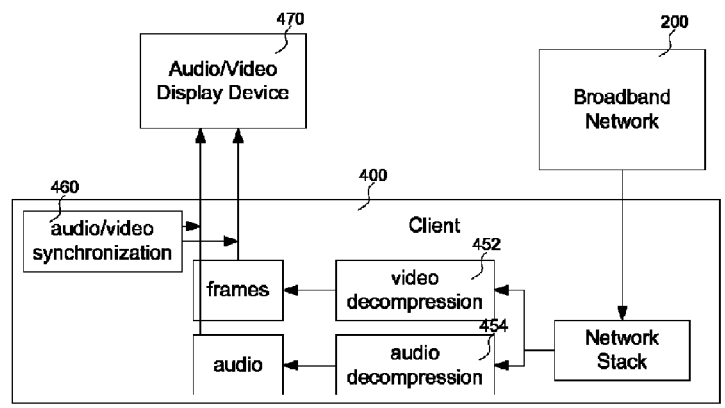
FIG. 3 is a block diagram showing, in one embodiment, components and steps for processing the received audio streams by a client.

FIG. 3 is a block diagram showing, in one exemplary embodiment of the present invention, components and steps for processing the received compressed video and audio stream by a client (400), synchronizing video and audio (460), and displaying the decompressed audio and video on the attached audio or video display device (e.g., television, LCD screen, TFT, monitor, speaker) (470). Upon receipt of the video or audio stream by a client (e.g., set-top box, PDA, personal computer, console, cellphone, media player), the client can decompress or decode the received video or audio (452 or 454), synchronize video and audio for display (460), and finally present the audio and video to the user through audio and video output device (470).

Further, in an embodiment, a client can be programmed to perform the various client process or method hereof described in the figures and respond to user's action. Said program(s) can be stored in storage device attached or integrated with a client (e.g., flash memory, hard drive, CD, DVD).

Alternatively, a client can be programmed to download or receive the program(s) that perform the various client process or method hereof described in the figures. For instance, in an embodiment, a client can comprise program stored in storage device (e.g., RAM, flash memory, hard drive, CD, DVD) that is instructed to download program(s) from one or multiple servers that perform the process or method hereof described in the figures.

Figure 4:
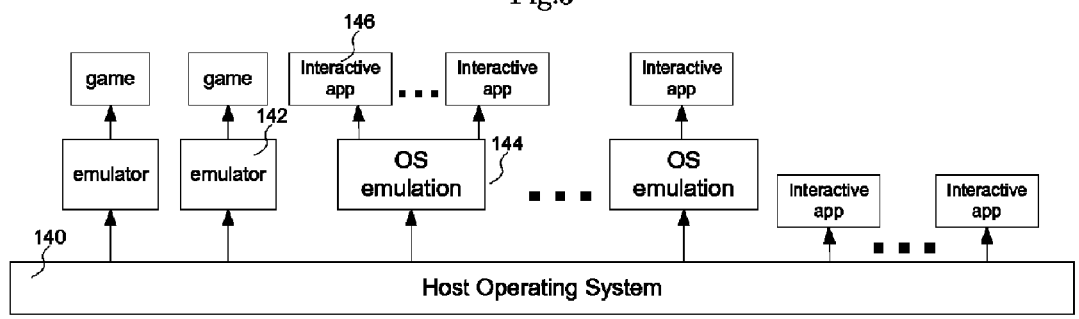
FIG. 4 is a block diagram showing, in one embodiment, components for running multiple interactive applications or multiple instances of the same interactive application on an interactive application host.

FIG. 4 is a block diagram showing, in one exemplary embodiment of the present invention, components for running multiple interactive applications (146) or multiple instances of the same application on an interactive application host using either direct execution or emulation (e.g., console emulator, virtual machine, operating system emulation/simulation). In accordance with the present invention, in one embodiment, an interactive application host can use emulation (e.g., emulator (142), virtual machine, OS emulation (144)) to run interactive applications developed for hardware platform or operating system different from the hardware or system of the interactive application host.

In one exemplary embodiment, an interactive application host can comprise multiple high performance computer processors or comprise multiple computer processors featuring several processing elements or processor cores in a single chip or in a single IC (integrated circuit) package, so called multi-core or many-core processors. In one exemplary embodiment, an interactive application host can run multiple emulation or simulation tasks with each task emulating a console or a computer platform or an operating system.

For example, in one embodiment, an interactive application host can run multiple emulators of some commercial game console or arcade. Furthermore, in each emulated platform, there can be one or multiple interactive application instances executed.

An interactive application host can also run emulation of another operating system (target operating system) in order to run interactive applications originally developed for the target operating system. Note that this can be done by providing compatible software implementation of the target operating system's kernel and main services. For example, using OS emulation (144), Windows interactive applications (146) can be executed on a Linux system.

Still referring to FIG. 4. the interactive applications hosted by an interactive application host can be single-user or multi-user applications. For a single-user application, the application receives interactive inputs from a single client. For a multi-user application, the application receives inputs from multiple or a collection of clients.

Furthermore, in an embodiment, to support large number of clients, multiple interactive application hosts can participate in running one interactive application (146). When emulation is used, the host operating system (140) running on the interactive application host can create emulation tasks that emulate the target platform or the target operating system along with the interactive application or applications running over the target platform or the target operating system.

Figure 5A:
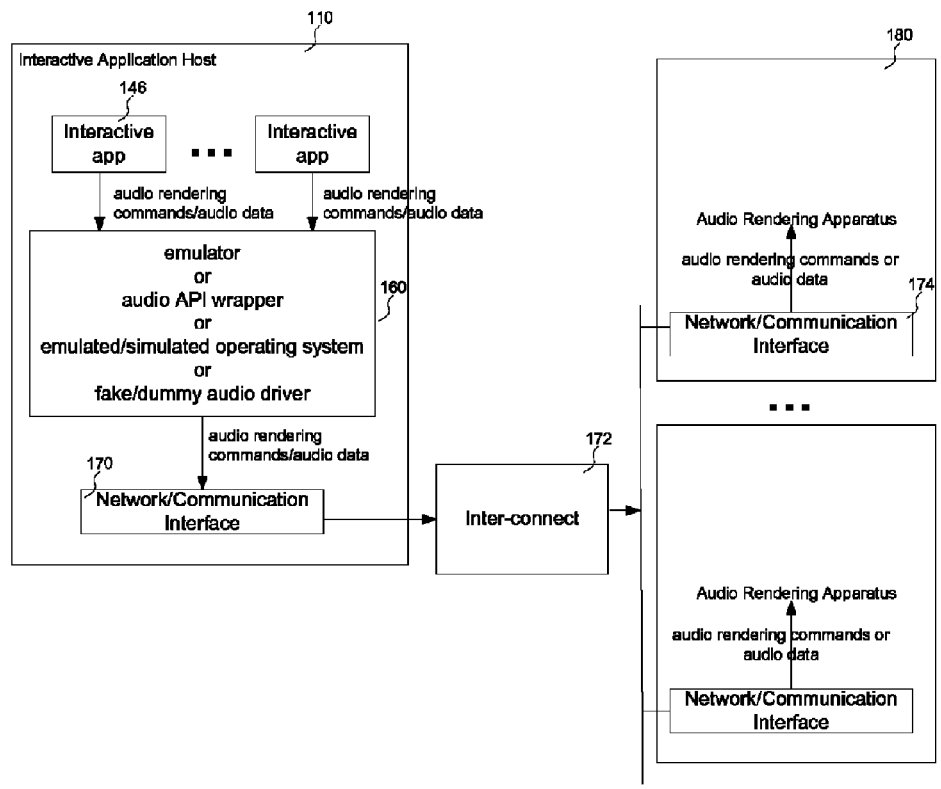
FIG. 5A is a block diagram showing that one or multiple audio rendering apparatuses connect with an interactive application host.
Figure 5B:
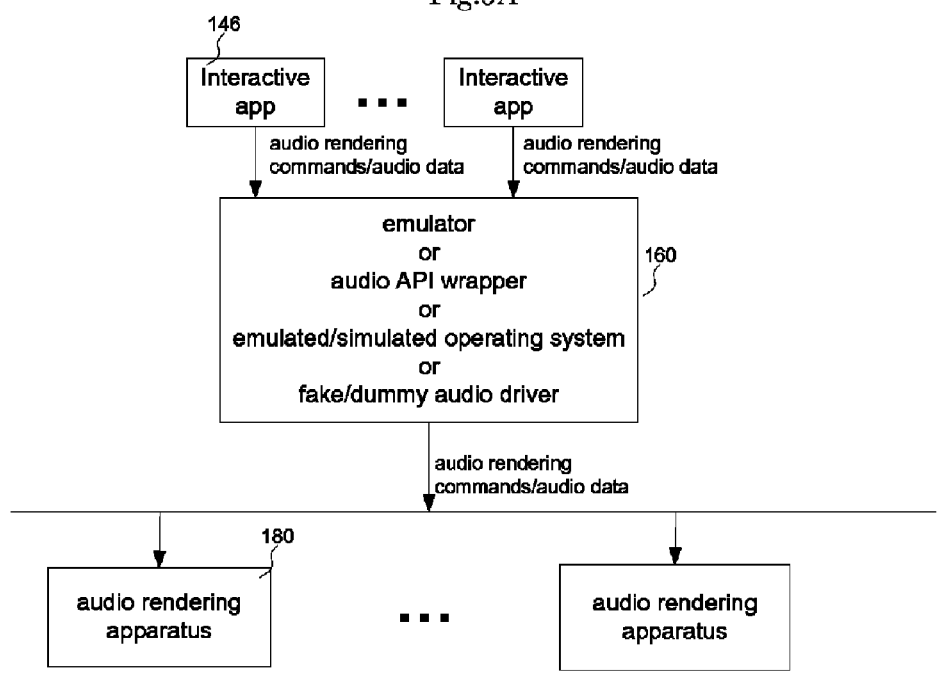
FIG. 5B is a block diagram showing that one or multiple audio rendering apparatuses connect with an interactive application host via local inter-connect mechanism.

FIG. 5A and FIG. 5B are block diagrams showing, in some exemplary embodiments of the present invention, components and steps of running interactive applications (146) on an interactive application host (110) and having audio rendered by dedicated audio rendering apparatus (180). In one embodiment, an interactive application host (110) can use audio API redirection or API wrapper or emulation to capture the audio rendering commands or audio data. For example, one popular audio API used for developing video games is DirectSound. Using API redirection, an interactive application host (110) can capture all the DirectSound API calls made by a game application and audio data sent by a game application for audio rendering.

In an alternative embodiment, fake or dummy audio device driver can be used to capture audio API calls or audio data. The dummy or fake audio driver can export standard audio device services similar to a real audio driver. After audio rendering commands or audio data (e.g., audio rendering control parameters, audio samples, speech, voice, audio sequence) are captured by either an emulator (160) or a redirected API interface or API wrapper or a dummy/fake audio device driver, they are sent to one or multiple audio rendering apparatuses for processing.

In an alternative embodiment, audio rendering can be carried out by the interactive application host itself (110).

FIG. 5A is a block diagram showing that one or multiple audio rendering apparatuses (180) connect with an interactive application host (110) via inter-connect (172) communications (e.g., system-area-network, local-area-network, or other similar inter-connect or network communications). An interactive application host can comprise one or multiple network/communication interfaces (170).

FIG. 5B is a block diagram showing that one or multiple audio rendering apparatuses (180) connect with an interactive application host (110) via local inter-connect circuitry (e.g., local bus, bus hierarchy, or other similar inter-connect circuitry).

Furthermore, in an embodiment, an inter-connection can comprise bus or inter-connect hierarchy involving one or multiple bus bridges, or one or multiple switches, or one or multiple chip inter-connects, or combination of local bus with system-area-network.

It should be understood that the scope of the present invention should not be limited to any specific inter-connect configuration or inter-connect topology between an interactive application host and audio rendering apparatus.

Figure 6A:
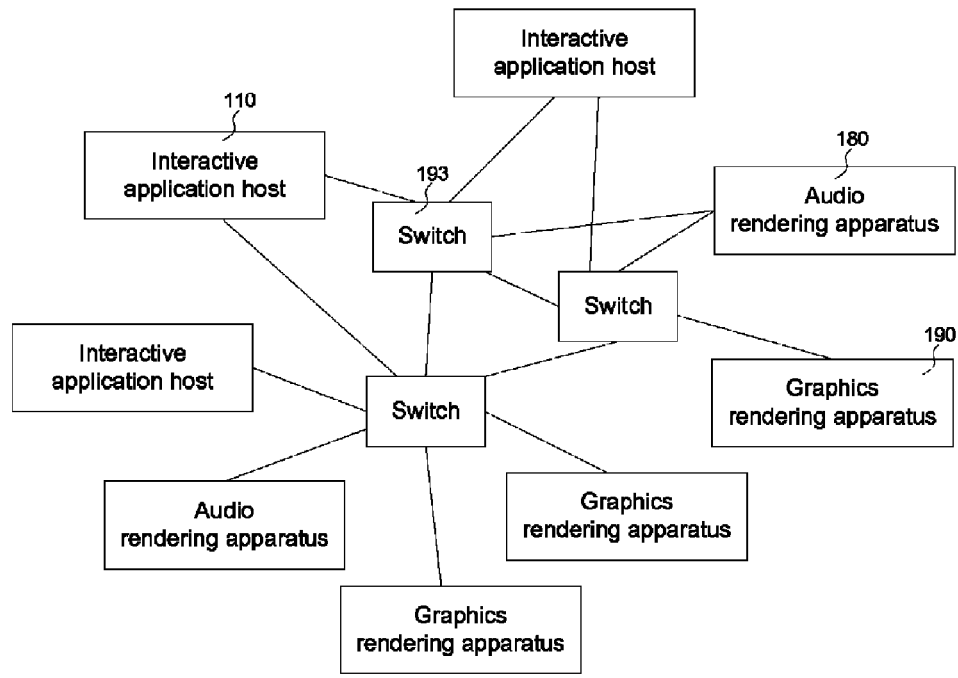
FIG. 6A is a block diagram showing, in one exemplary embodiment, switch mechanism that connects multiple interactive application hosts with multiple audio rendering apparatus.

FIG. 6A is a block diagram showing, in one exemplary embodiment of the present invention, inter-connect mechanism that connects multiple interactive application hosts (110) with one or multiple audio rendering apparatuses (180), or with one or multiple audio-graphics rendering apparatuses that integrate audio and graphics rendering capability. In one embodiment, an audio rendering apparatus (180) can be shared by multiple interactive application hosts. An interactive application host (110) can access multiple audio rendering apparatuses (180). Furthermore, a graphics rendering apparatus (190) and an audio rendering apparatus can be combined into one apparatus that supports both graphics and audio processing.

Figure 6B:
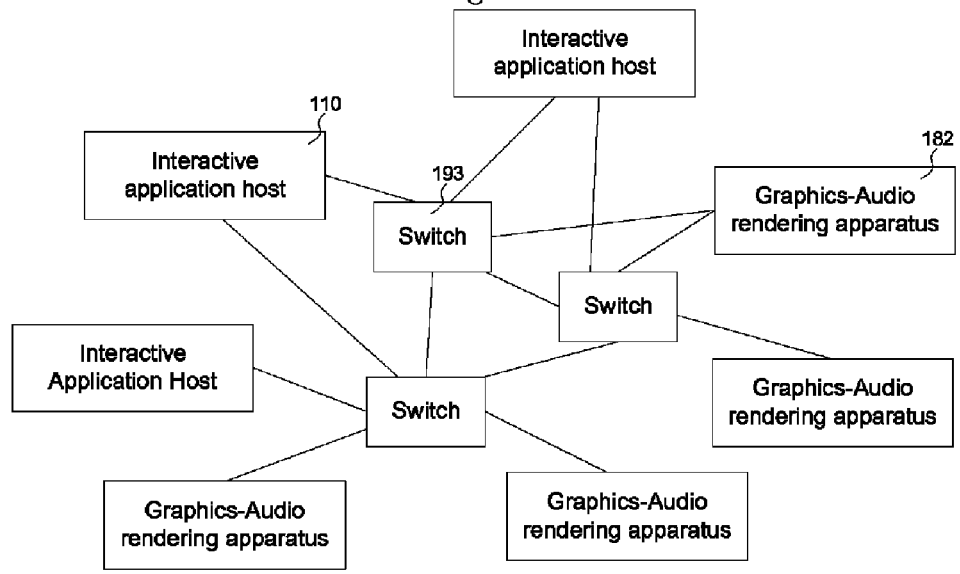
FIG. 6B is a block diagram showing, in one exemplary embodiment, switch mechanism that connects multiple interactive application hosts with multiple integrated audio and graphics rendering apparatuses.

FIG. 6 B is a block diagram showing, in one exemplary embodiment of the present invention, inter-connect mechanism that connects multiple interactive application hosts with one or multiple integrated audio and graphics rendering apparatuses. The inter-connect in FIG. 6 A and FIG. 6 B can be bus bridge based, or Infiniband based, or advanced switching fabric built over high speed bus, or Gigbit ethernet, or other system-area-network inter-connect, or local-area-network, or broadband network, or other similar inter-connect mechanism or network communications.

It should be understood that FIG. 6 A and FIG. 6 B are for illustration purpose only. The scope of the present invention should not be limited to the illustrated embodiments or any specific inter-connect configuration or inter-connect topology or inter-connect standards.

Figure 7A:
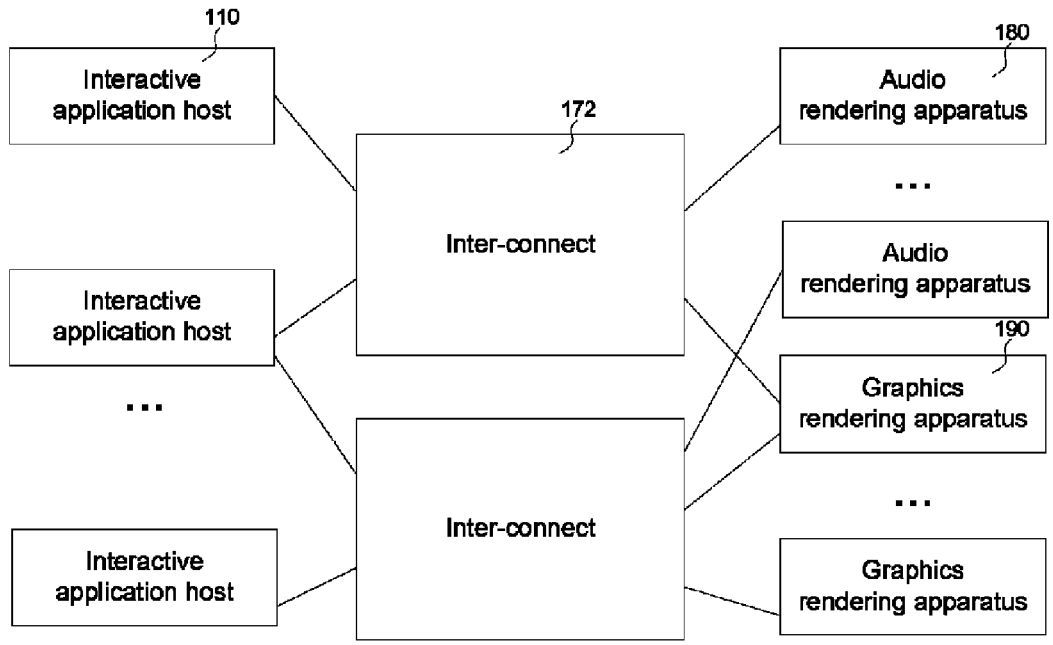
FIG. 7A is a block diagram showing, in another exemplary embodiment, inter-connect mechanism that connects multiple interactive application hosts with multiple audio rendering apparatuses.
Figure 7B:
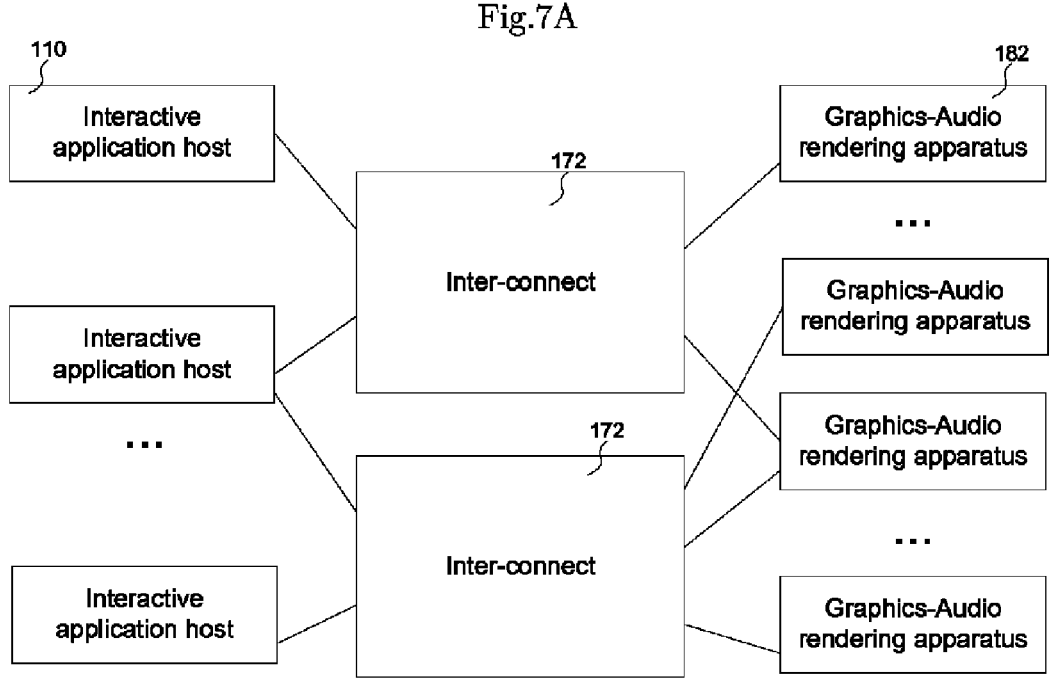
FIG. 7B is a block diagram showing, in another exemplary embodiment, inter-connect mechanism that connects multiple interactive application hosts with one or multiple integrated audio and graphics rendering apparatuses.

FIG. 7 A is a block diagram showing, in one exemplary embodiment of the present invention, inter-connect mechanism that connects multiple interactive application hosts (110) with multiple audio rendering apparatuses (180) and graphics rendering apparatuses (190). The inter-connect mechanism includes but not limited to, bridge, or switch, or advanced switching fabric, or system-area-network, or local area network, or broadband network, or other similar inter-connect mechanism or network communications. For example, in an embodiment, an inter-connect (172) can be Infiniband, or bus bridge, or Gigbit ethernet, or advanced switching fabric based on PCI-Express or other high speed bus, or local-area-network, or broadband network, or other similar inter-connect mechanism.

FIG. 7 B is a block diagram showing, in one exemplary embodiment of the present invention, inter-connect mechanism that connects multiple interactive application hosts (110) with one or multiple integrated audio and graphics rendering apparatuses (182). Said inter-connect mechanism includes but not limited to, system-area-network, or bridge, or switch, or local area network, or broadband network, or other similar inter-connect mechanism or network communications.

It should be understood that FIG. 7 A and FIG. 7 B are for illustration purpose only. The scope of the present invention should not be limited to any specific inter-connect configuration or inter-connect topology or inter-connect standards.

Figure 8:
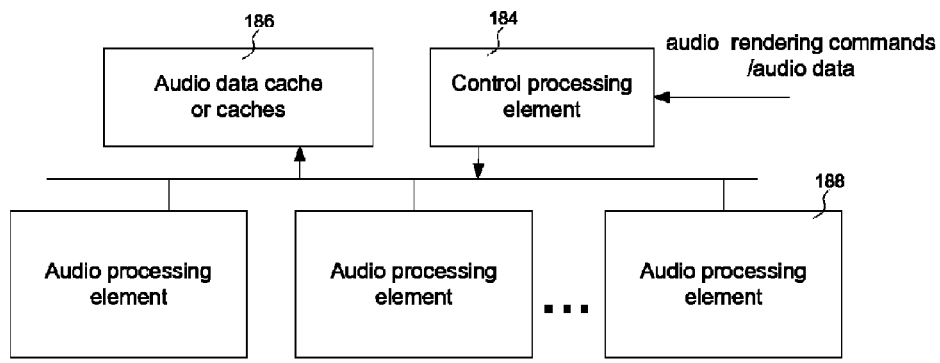
FIG. 8 is a block diagram showing, in one embodiment, components of audio rendering apparatus.

FIG. 8 is a block diagram showing, in one exemplary embodiment of the present invention, components of an audio rendering apparatus. in an embodiment, an audio rendering apparatus comprises one or multiple control processing elements (184), or one or multiple audio processing elements (188) (e.g., DSP, or FPGA, or CPLD, or dedicated audio processing ASIC chip, or micro processor), or one or multiple audio data caches (186) or audio data databases. An audio rendering apparatus can render or compress audio for multiple interactive applications or multiple instances of interactive applications or audio rendering targeted for multiple clients.

In a further embodiment, an audio rendering apparatus can comprise one or multiple network/communication interfaces. In addition, it can receive audio rendering commands or audio data from multiple interactive application hosts via inter-connect mechanism (e.g., system-area-network, local-area-network, broadband network, or other similar inter-connect or network communications). In accordance with the present invention, in an additional embodiment, the rendered audio data can be compressed and sent to the clients or sent to the interactive application host.

One interactive application may respond to different number of clients varying from only one to a dozen or hundreds to even thousands. Furthermore, an interactive host may host more than one interactive application or multiple instances of an interactive application. If the application uses interactive audio or spatial audio, each client may receive different audio based on the interactivity. Using dedicated audio rendering apparatus makes it easier to manage audio rendering workload. One performance metric of the audio rendering apparatus is the amount of interactive clients it can handle at per unit of time. Moreover, an audio rendering apparatus can be combined with graphics rendering apparatus to provide both interactive graphics rendering and audio rendering in one apparatus.

Still referring to FIG. 8, an audio rendering apparatus can comprise one or multiple audio processing elements. In one embodiment, an audio processing element (188) can process one or multiple streams of audio commands and/or audio data from one or multiple interactive applications or from multiple instances of an interactive application. An audio processing element (188) can comprise a DSP (digital signal processor), or a micro processor, or a FPGA chip, or a CPLD, or an audio processing IC, or other similar processing element capable of running audio processing or simulation.

In one embodiment, an audio rendering apparatus comprises one or multiple control processing elements (184). A control processing element takes the role of setting up the apparatus, or dispatching audio processing workload to the audio processing element (188). In an additional embodiment, an audio rendering apparatus comprises one or multiple audio data caches (186), or one or multiple audio databases.

In an embodiment, an audio data cache (186) is used for caching audio data locally in an audio rendering apparatus to save bandwidth of transmitting audio data from an interactive application host to the audio rendering apparatus. For a typical interactive application, a set of audio data may be used repeatedly for interactive audio rendering, an audio rendering apparatus can cache those audio data in its local storage instead of transmitting the data over and over again each time when they are needed.

The local storage can comprise any volatile or persistent memory device. For example, a cache includes but not limited to, DRAM, or SDRAM, or flash memory, or SRAM, or hard drive, or integrated memory device, or other similar memory or storage device. It should be understood that the scope of the present invention should not be limited by the type of cache or memory device for caching audio data.

Still referring to audio data cache. An audio data cache (186) can improve its efficiency by reducing redundant copy of audio data. Instead of caching many identical copies of the same audio data, an audio data cache (186) can reduce audio data duplication in the following exemplary scenarios, audio data shared by different instances of the same interactive application executed by either the same interactive application host or by different interactive application hosts; audio data shared by different clients of the same interactive application or different interactive applications. For those shared audio data, an audio cache needs only one copy of the data.

In one embodiment, audio data caching can be explicitly managed by the interactive applications or the interactive application hosts. For example, in one embodiment, an audio data cache can act as an audio database. An interactive application can directly refer to the data stored in the cache.

In another embodiment, audio data cache can be transparent to the interactive applications. In this case, the interactive application host or the emulation software or the dummy device driver or the audio rendering apparatus can take the responsibility of identifying audio data that need to be cached.

In another embodiment, audio data cache resource can be partitioned to different interactive application hosts or clients or even partitioned to different interactive applications or instances of interactive applications either equally or unequally. The partitioned audio data cache resources can be explicitly or implicitly managed. Alternatively, audio data cache resource can also be shared among interactive application hosts or the clients or interactive applications or instances of interactive applications.

In another alternative embodiment, an audio rendering apparatus can use transaction based approach for managing audio data cache (186). In this case, operations such as adding a new piece of audio data or querying whether some audio data is cached are done through requests. For instance, if an interactive application host wants a piece of audio data to be cached by an audio rendering apparatus, it can send a request. Upon receipt of the request, if there is space, the request will be fulfilled. In an alternative embodiment, the requests can be sent to a broker whose job is to manage the resources for the audio rendering apparatus. The broker keeps track of the cache resource usage for one or multiple audio rendering apparatuses and responds to the requests from the interactive application hosts. Moreover, a broker can manage the cache resources on behalf of one or multiple audio rendering apparatuses.

Figure 9:
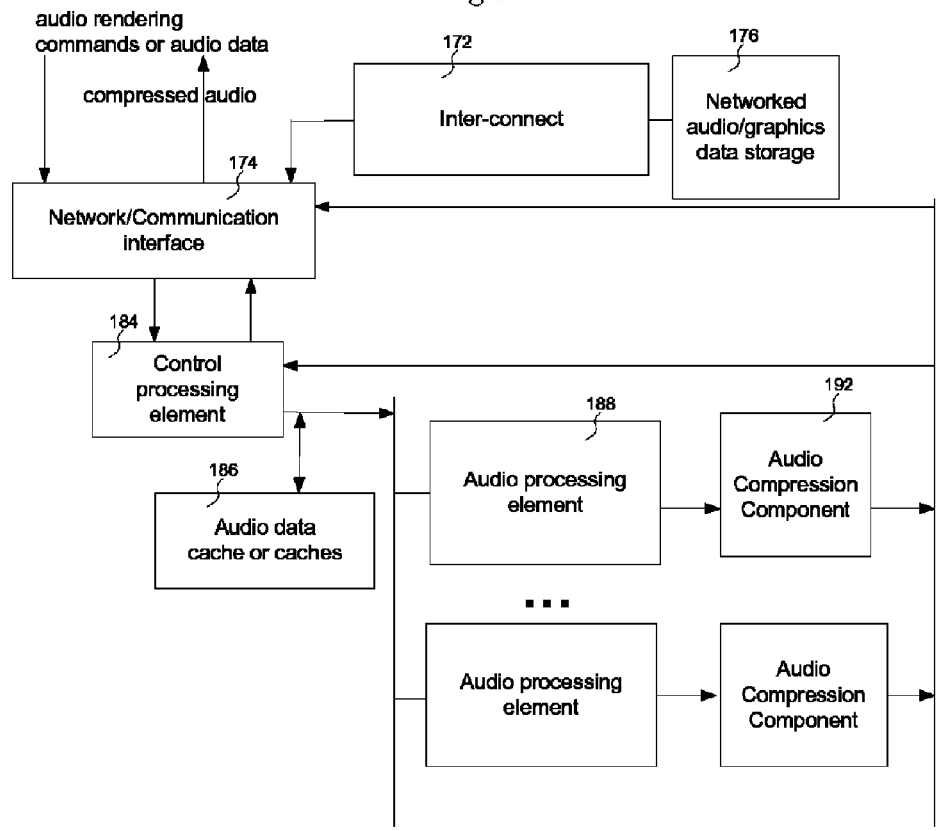
FIG. 9 is a block diagram showing, in one additional embodiment, components of audio rendering apparatus with audio compression support.

FIG. 9 is a block diagram showing, in one additional exemplary embodiment of the present invention, components of audio rendering apparatus with audio compression support. An audio rendering apparatus can comprise one or multiple control processing elements (184), or one or multiple audio processing elements (188), or one or multiple audio data caches (186), or one or multiple audio data databases. After audio rendering, audio data are compressed by one or multiple audio compression components (192).

In a further exemplary embodiment, an audio rendering apparatus is networked, comprising one or multiple network/communication interfaces (174) (e.g., local area network interface, system-area-network interface). Examples of system-area-network include but not limited to, Infiniband or advanced switching fabric over high speed bus such as PCI-Express or other similar system-area-network.

In one embodiment, a networked audio rendering apparatus can access networked storage of audio data (176) (e.g. audio data, audio database, audio data file) via its network interface.

Figure 10:
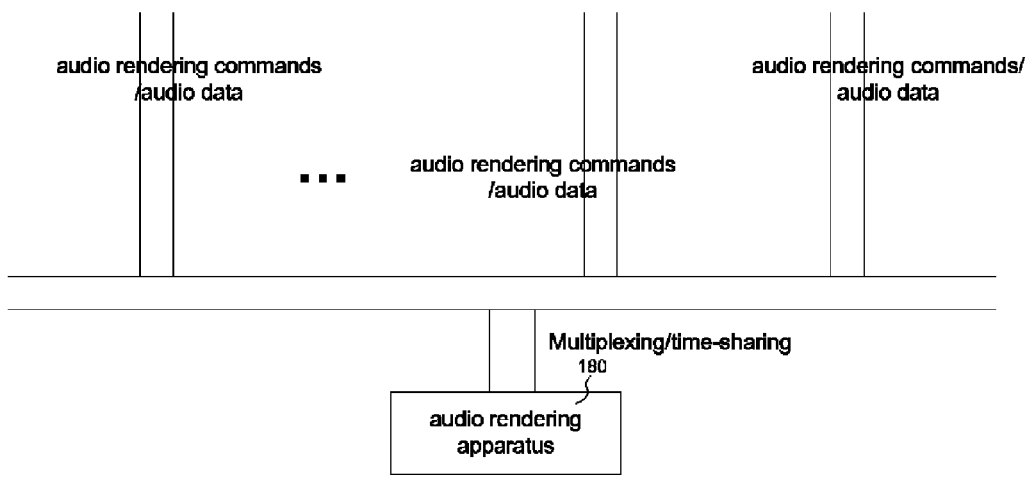
FIG. 10 is a block diagram showing, in one embodiment, audio workload multiplexing by an audio rendering apparatus.

FIG. 10 is a block diagram showing, in one exemplary embodiment of the present invention, that an audio rendering apparatus (180) through workload multiplexing or time-sharing approach processes audio rendering commands and/or audio data for multiple interactive applications or multiple instances of the same interactive application or multiple clients. In one embodiment, audio rendering commands and/or audio data from multiple interactive applications, or multiple instances of interactive applications, or targeted for multiple clients can be multiplexed to be processed by an audio rendering apparatus (180) in order to achieve maximum audio processing throughput.

In one embodiment, an audio rendering apparatus (180) can process concurrently multiple audio rendering commands and/or audio data from either the same interactive application, or from different interactive applications, or from different instances of the same interactive application. Furthermore, the audio rendering commands can be targeted for one or multiple clients.

Figure 11A:
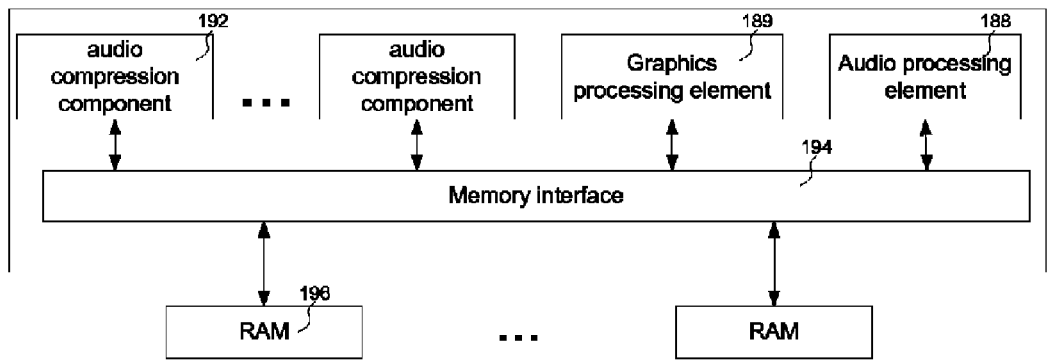
FIG. 11A is a block diagram showing, in one embodiment, audio rendering and/or audio compression and graphics rendering integrated into the one IC (integrated circuit).

FIG. 11A is a block diagram showing, in one exemplary embodiment of the present invention, audio rendering and audio compression, or graphics rendering can be integrated into the same IC (integrated circuit). In one embodiment, an IC can comprise audio rendering integrated with functionality of audio compression. Said IC can comprise one or multiple audio compression components (192). In additional embodiment, graphics rendering and audio rendering can be integrated in the same IC.

In a further embodiment, said integrated graphics and audio IC can comprise one or multiple audio or frame/video compression components (192). In one embodiment, audio or frame/video compression component of the IC, or the graphics rendering element (189), or the audio rendering element can connect to a shared memory interface as shown in FIG. 11A.

In other exemplary embodiment, compression component or rendering element can have separate memory interfaces (194). Rendered graphics frames or audio data can be stored in off-chip or on-chip storage devices. Audio or video compression components (192) can read the graphics frames or audio data and compress them. A storage device can be any volatile or persistent memory device that can store information (196). It includes but not limited to, DRAM, or SDRAM, or flash memory, or SRAM, or other similar memory device. It should be understood that the scope of the present invention should not be limited to any specific type of storage device.

Figure 11B:
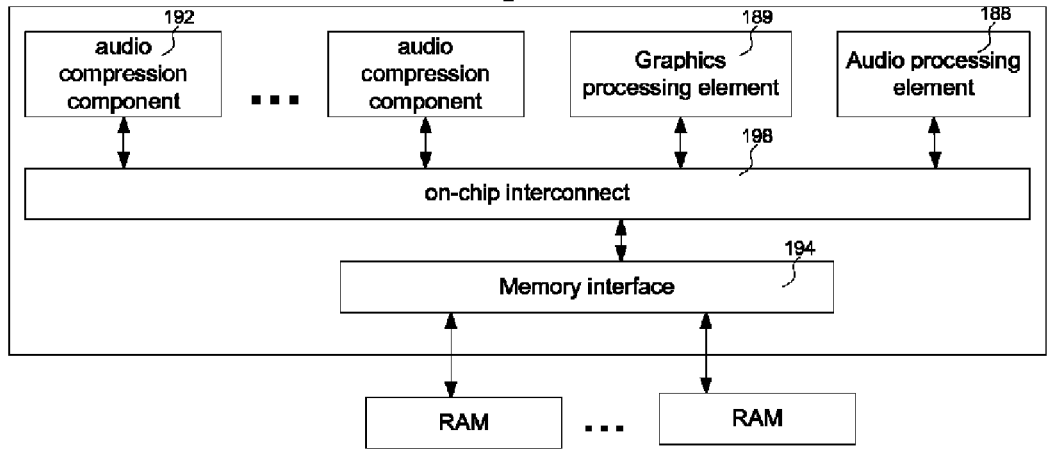
FIG. 11B is a block diagram showing, in one embodiment, inter-connect of audio compression components and audio rendering components.

FIG. 11B is a block diagram showing, in one exemplary embodiment of the present invention, that audio rendering and audio compression, or graphics rendering and frame/video compression can be integrated into the same IC. In one embodiment, audio or frame/video compression components, or graphics or audio rendering elements can be inter-connected using shared inter-connect circuitry (e.g., bus, crossbar, on-chip bridge, on-chip switch, other similar on-chip inter-connect (198) or routing mechanism). An inter-connect mechanism can connect one or multiple audio or frame/video compression components with one or multiple audio or graphics processing elements.

In one embodiment, rendered graphics frames or audio data can be streamed to the frame/video or audio compression components for compressing. Alternatively, the rendered graphics frames or rendered audio data can be stored in one or multiple off-chip or on-chip storage devices. The frame/video or audio compression component can read the graphics frames or audio data from the storage device and compress the data.

Figure 12A:
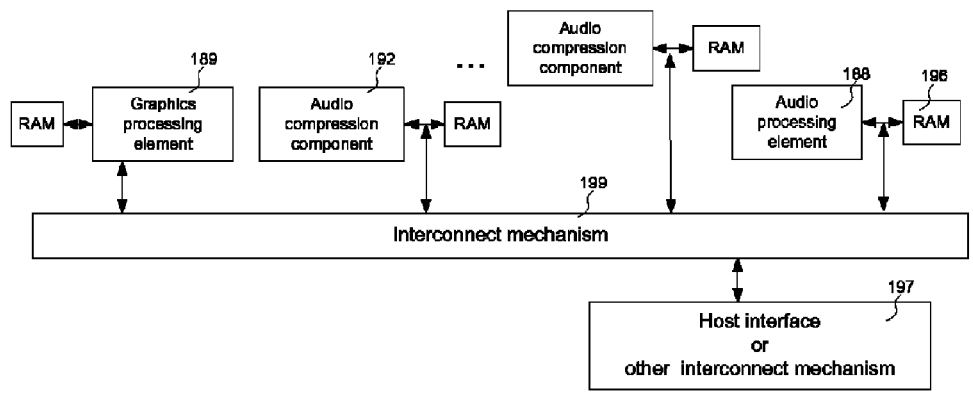
FIG. 12A is block diagrams showing, in alternative embodiment, inter-connect of audio rendering component and audio compressing component.
Figure 12B:
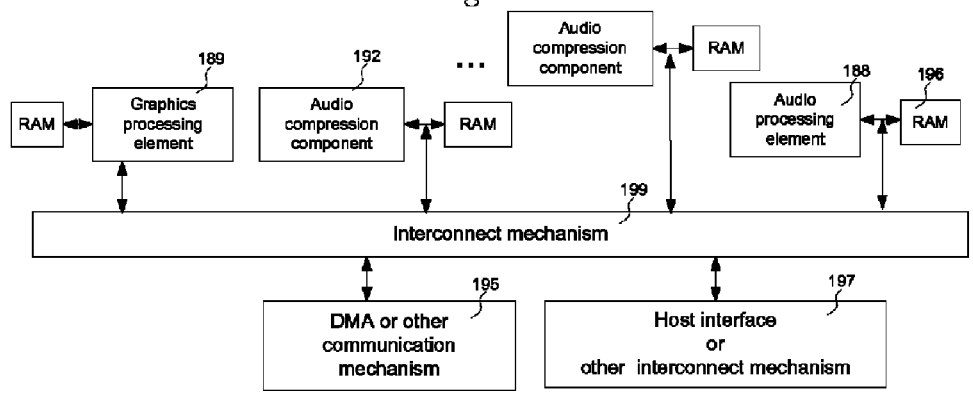
FIG. 12B is block diagrams showing, in one additional embodiment, DMA (direct memory access) engines for transmitting data between storage of audio rendering and audio compressing component.
Figure 12C:
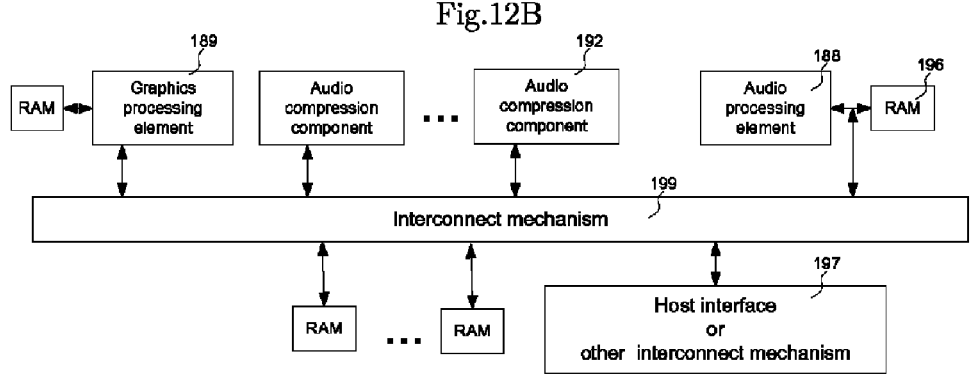
FIG. 12C is block diagrams showing, in one additional embodiment, shared storage interface between audio rendering and compressing component.

FIGS. 12A, 12B, and 12C are block diagrams showing, in some exemplary embodiments of the present invention, that graphics rendering or audio rendering elements are integrated with frame/video or audio compression components (192) in the same system or on the same PCB (printed circuit board). An integrated system or PCB can comprise one or multiple graphics processing elements (189), or one or multiple audio processing elements (188), or one or multiple frame/video or audio compression components (192).

FIG. 12A is block diagram showing, one embodiment of the present invention, where in graphics rendering element, or audio rendering element, or one or multiple audio or frame/video compression components are inter-connected via inter-connect circuitry (199) (e.g., shared bus, crossbar, bridge, switch, or other similar chip inter-connect or routing mechanism). In the exemplary embodiment shown in FIG. 12A, the audio or video compression component has its own local RAM (196) or storage used as local storage space. Furthermore, in additional embodiment, said system or PCB can comprise as a stand-alone device with a host interface or network interface or other inter-connect interface (197).

FIG. 12 B is block diagrams showing, one additional embodiment based on the embodiment shown in FIG. 12 A, where there is one or multiple DMA (direct memory access) engines or communication mechanism (195) for transmitting data among the local storages of the rendering element or the compression components. For audio processing using DMA processed or rendered audio data can be also trans-mitted to the local storage of one or multiple audio compression components (192) for compressing. Transmission can be push based or pull based issued by either the audio rendering element or issued by the compression component.

FIG. 12 C is a block diagram showing, one additional exemplary embodiment of the present invention, where one or multiple audio or video compression components use shared storage device (e.g., shared memory). It should be understood that the embodiments shown in FIG. 12 A to FIG. 12 C are for illustration purpose. They are not intended to limit the scope of the present invention to only the illustrated embodiments.

Figure 13:
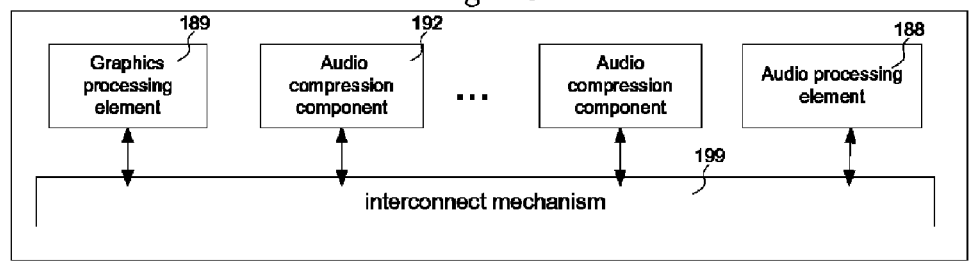
FIG. 13 is a block diagram showing, in one embodiment, graphics rendering and audio rendering component integrated in the one IC package.

FIG. 13 is a block diagram showing, in one exemplary embodiment of the present invention, wherein one or multiple graphics rendering or audio rendering elements are integrated with one or multiple frame/video or audio compression components (192) in the same IC package using system-in-a-package technique (e.g., system-in-a-package, 3D IC technique, or other similar technique). In one embodiment, an IC package can comprise one or multiple graphics rendering elements, or one or multiple audio rendering elements, or one or multiple audio or frame/video compression components, or chip inter-connection component (199), or one or multiple storage devices. Said inter-connect component can comprise shared bus, or bridge, or crossbar, or switch, or system-area-network, or routing circuitry, or inter-connect, or other similar inter-connect or network mechanisms.

Figure 14:
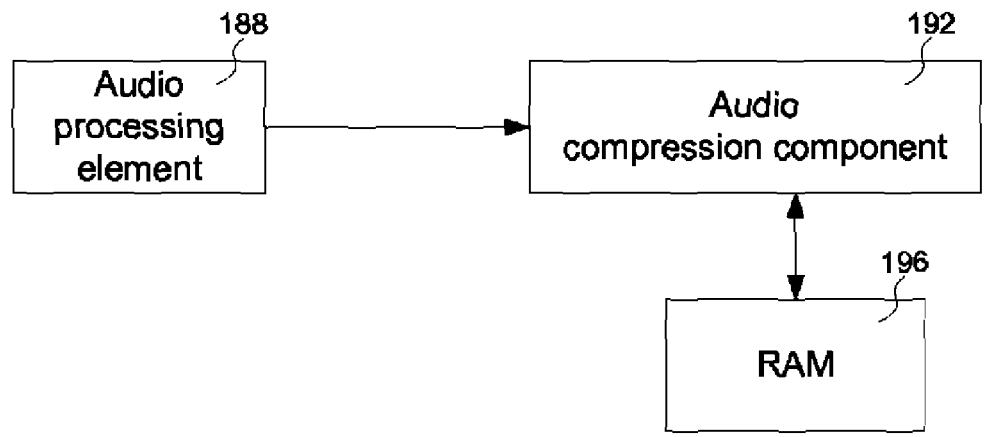
FIG. 14 is a block diagram showing, in one embodiment, streamlined audio rendering and compression.

FIG. 14 is a block diagram showing, in one embodiment of the present invention, where audio rendering results are streamed for audio compression (192). In this embodiment, rendered audio data are transmitted to one or multiple audio compression components (192) via direct connection circuitry. Said audio compression component (192) can store the rendered audio data in their local storage and compress them.

Figure 15:
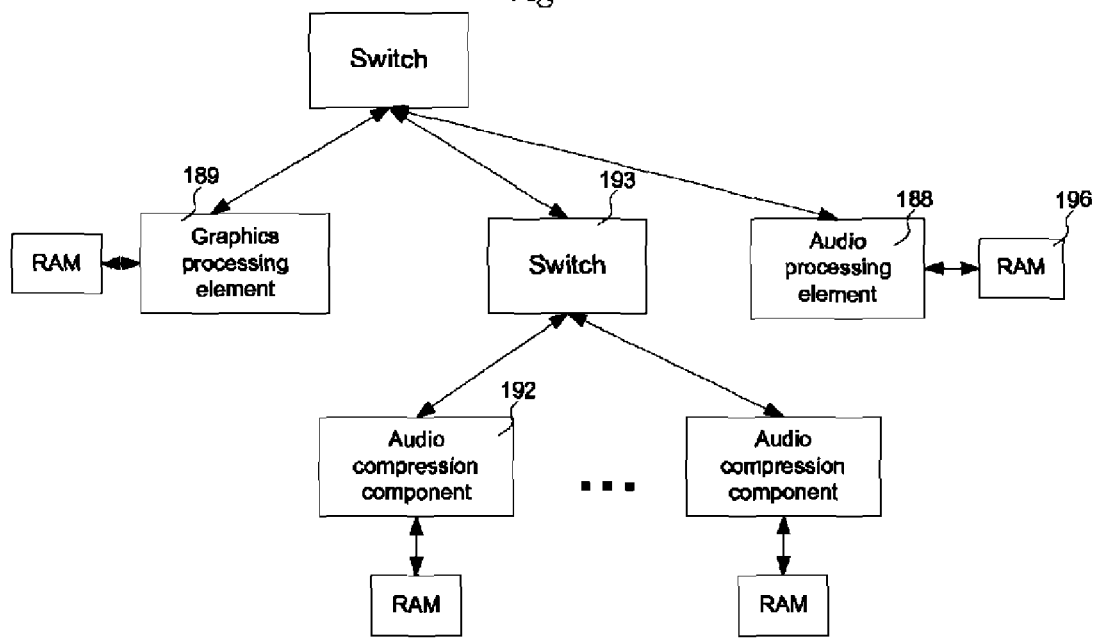
FIG. 15 is a block diagrams showing, in one alternative embodiment, interconnected audio rendering component and audio compressing components.

FIG. 15 is a block diagram showing, in one embodiment of the present invention, where audio rendering element or apparatus and one or multiple audio compression components (192) are inter-connected. The bus inter-connect circuitry can be PCI based or PCI-Express based or Infiniband based or based on other similar inter-connect structure. It should be understood the exemplary embodiment shown in FIG. 15 is for illustration purpose only. It is not intended to limit the scope of the present invention to only the illustrated embodiments or the illustrated inter-connect architecture or inter-connect topology. The scope of the present invention should not be limited to any specific inter-connect architecture or any specific inter-connect topology or any specific inter-connect mechanism or inter-connect standard.

Figure 16A:
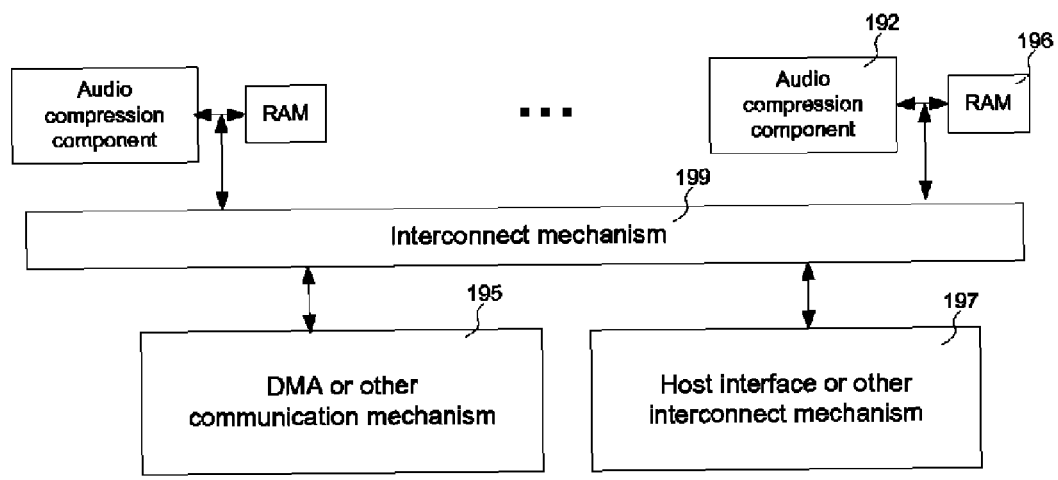
FIG. 16A is a block diagram showing, in one embodiment, audio compressing acceleration module.
Figure 16B:
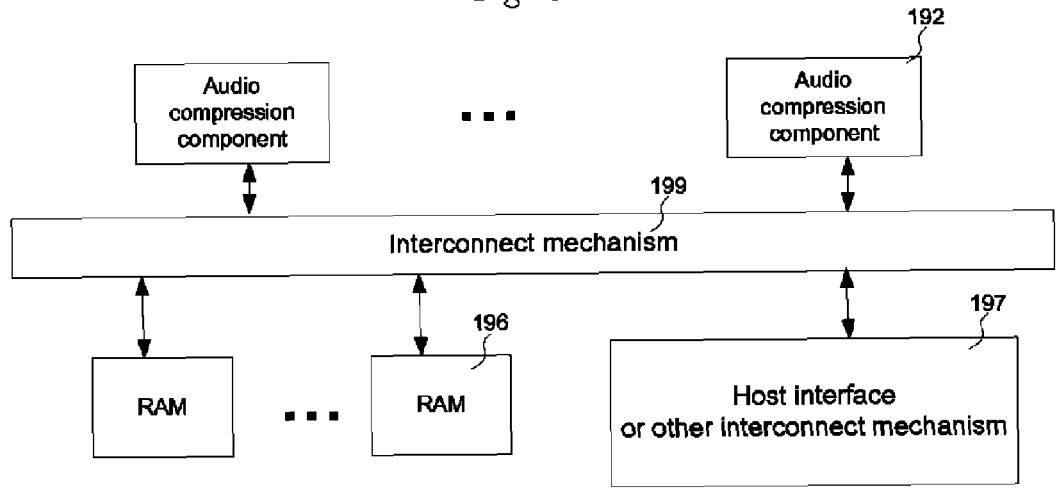
FIG. 16B is a block diagram showing, in another embodiment, shared storage among multiple audio compression components.

FIG. 16 A is a block diagram showing, in one exemplary embodiment of the present invention, one or multiple audio or frame/video compression components (192) are used to create a frame/video or audio compression acceleration module. In FIG. 16 A, one or multiple audio or frame/video compression components (192) are inter-connected (e.g., shared bus, crossbar, bridge, switch or system-area-network or other similar inter-connect or network mechanism (199)). In the embodiment shown in FIG. 16 A, a frame/video or audio compression component (192) has its own local storage device (196). One or multiple DMA engines or other similar communication component (195) can be used to transmit data across the local storages of different compression components.

FIG. 16 B is a block diagram showing, another exemplary embodiment of the present invention, wherein one or multiple audio or video compression components (192) use shared storage device (e.g., shared memory).

In accordance with the present invention, a frame/video or audio compression component (192) can include but not limited to DSP, FPGA, audio or frame/video compression ASICs, combination of one or multiple DSPs with one or multiple FPGAs, or combination of one or multiple DSPs with one or multiple frame/video or audio compression ASICs, or combinations of one or multiple FPGAs with one or multiple frame/video or audio compression ASICs, or other similar fixed or programmable audio or frame/video compression device.

Furthermore, said frame/video or audio compression component (192) can also comprise inter-connect mechanism (199) that connects one or multiple DSPs, or FPGAs, or audio or frame/video compression ASICs, or other similar audio or video compression devices. An inter-connect mechanism (199) can comprise shared bus, or direct chip inter-connect, or bridge, or crossbar, or switch, or bus hierarchy, or system-area-network, or local-area-network, or other similar inter-connect or network communications.

In additional exemplary embodiment, said audio processing element, or audio or frame/video compression component can connect to its own storage device, or share storage device via inter-connect (e.g., shared bus, crossbar, bridge, switch, or other similar inter-connect or shared memory interface).

Figure 17A:
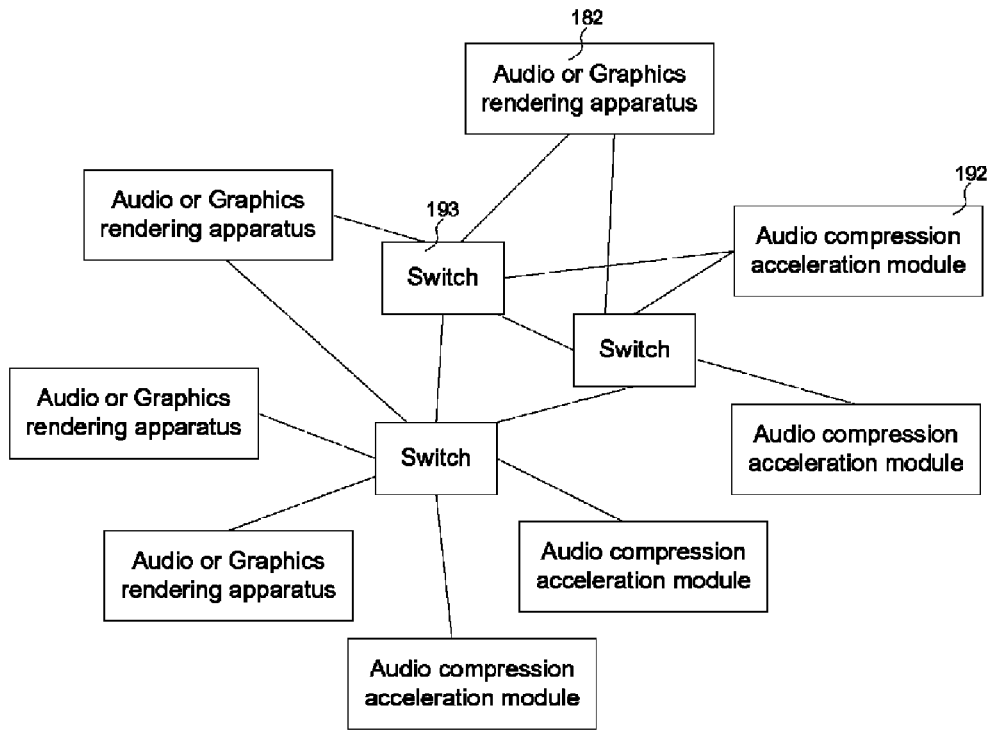
FIG. 17A is a block diagram showing, in one exemplary embodiment, inter-connect mechanism that connects multiple audio rendering apparatuses with multiple audio compression acceleration modules.
Figure 17B:
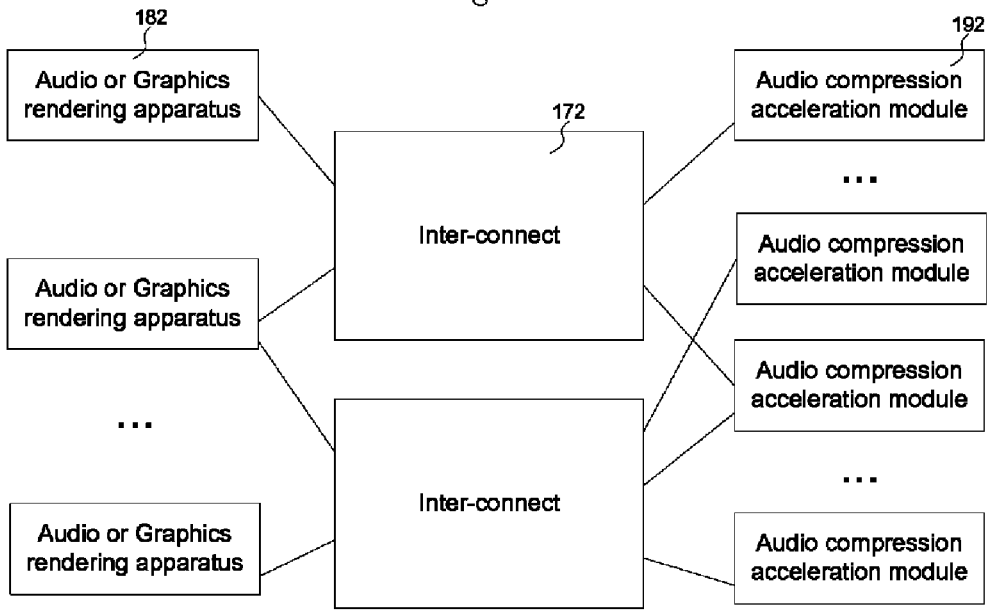
FIG. 17B is a block diagram showing, in another exemplary embodiment, inter-connect mechanism that connects multiple audio rendering apparatuses with multiple audio compression acceleration modules

FIG. 17 A is a block diagram showing, in one exemplary embodiment of the present invention, inter-connect mechanism (199) that connects one or multiple audio rendering apparatuses with one or multiple audio or frame/video compression acceleration modules. Said audio or frame/video compression acceleration module can be based on the embodiments shown in FIG. 16 A or FIG. 16 B. The inter-connect between the rendering apparatus and the audio compression acceleration module includes but not limited to, bridge, or switch, or advanced switching fabric, or system-area-network, or local area network, or other similar inter-connect mechanism or network communications. For example, the inter-connect (172) can be Infiniband, or bus bridge, or Gigbit ethernet, or advanced switching fabric based on the PCI-Express or other high speed bus, or other similar inter-connect mechanism or network communications.

FIG. 17 B is a block diagram showing, in one exemplary embodiment of the present invention, inter-connect mechanism that connects multiple audio apparatuses with one or multiple audio or frame/video compression acceleration modules via inter-connect mechanism (e.g., bridge, crossbar, switch, advanced switching fabric, system-area-network, local-area-network, or other similar inter-connect mechanism or network communications.

It should be understood that FIG. 17 A and FIG. 17 B are for illustration purpose only. The scope of the present invention should not be limited to any specific inter-connect configuration or inter-connect topology or inter-connect standards.

Figure 18:
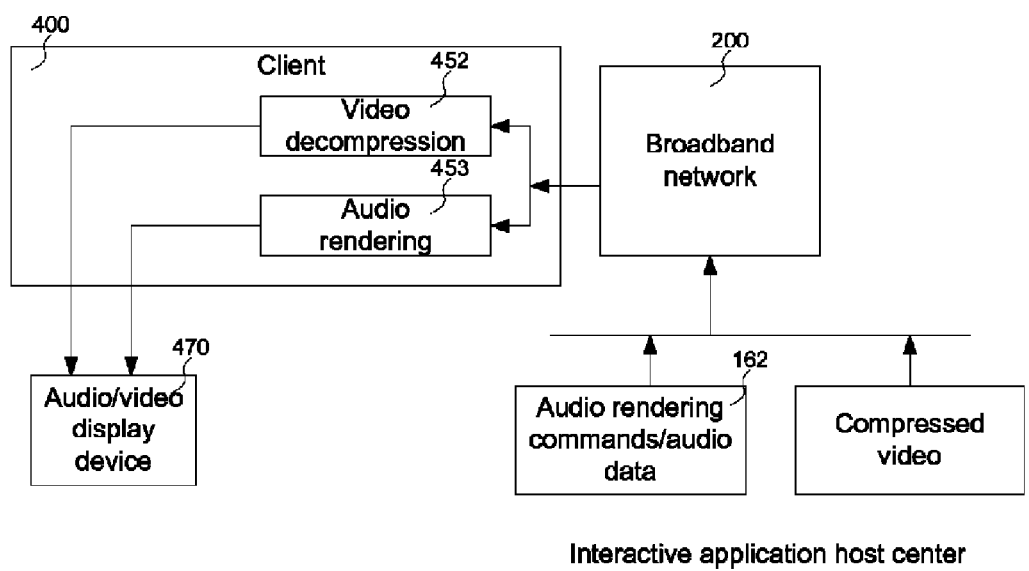
FIG. 18 is a block diagram showing, in one embodiment, components of transmitting audio rendering commands and/or audio data to a client.

FIG. 18 is a block diagram showing, in one exemplary embodiment of the present invention, audio rendering commands or audio data are transmitted to the client. The client processes said audio rendering commands (162), simulates audio effects, and synchronizes audio rendering (453) with the video display. In one embodiment of the present invention, a client can have significant processing capability and resources for audio processing and simulation. Given that there is enough network bandwidth, an interactive application host center can transmit audio rendering commands (162), and/or audio data to the client and have the audio effect simulation or processing completed by the client.

Note that in the exemplary embodiment shown in FIG. 18, video or graphics is still rendered, or compressed at the host side. An advantage of this embodiment is that it reduces the complexity of the host center.

An interactive application host center can synchronize video-audio rendering and transmission. In one embodiment, audio can be used as reference for synchronization in which display timing of the associated video frames have to be adjusted to be consistent with the audio presentation. The actual synchronization will be performed at the client side when the audio and video are displayed. The audio or graphics rendering apparatus or the interactive application host embeds the synchronization signals or synchronization associations between the audio and video streams into the video or audio streams transmitted to the clients.

It should be understood that there are multiple ways to construct audio and video stream association for synchronization purpose and the association can be created at different stage of the host side processing. The scope of the present invention should not be limited to any specific way of implementing video-audio synchronization.

In additional embodiment, an interactive application host, or the graphics or audio rendering apparatus can also vary or adjust the generated frame rate compatible with the speed of the client video display device.

As various changes can be made in the above embodiments and operating methods without departing from the spirit or scope of the following claims, it is intended that all matter contained in the above description or shown in the accompanying drawings should be interpreted as illustrative and not in a limiting sense. The invention is not limited by the specific embodiments described herein. Variations or modifications to the design and construction of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention.

What is claimed is:

1. A method of hosting at least one interactive application through at least one interactive application host center and delivering audio of a running interactive application to at least one client, comprising the following processes, receiving interactive input by an interactive application host wherein said interactive application host is assigned to execute an interactive application for a client and said interactive input is sent from said client over network;

executing the interactive application by at least one interactive application host under the control of the received interactive input wherein said interactive application host comprises multiple processing elements and can run multiple interactive applications for a plurality of clients;

transmitting audio rendering commands generated by the executed interactive application to at least one audio rendering apparatus;

processing audio rendering commands of the executed interactive application by the audio rendering apparatus, simulating audio effect by an audio simulation means and/or audio mixing means, and generating digital audio output;

compressing and/or encoding said rendered audio by at least one audio compression component integrated with the audio rendering apparatus, or by at least one audio compression acceleration module connected with the audio rendering apparatus or interactive application host;

transmitting said compressed and/or encoded audio to at least one client over network; and decompressing and/or decoding the received audio and presenting the audio by the client.

2. The method in claim 1, wherein the compressed or encoded audio is transmitted to the client, further comprising, transmitting the audio using multi-cast to at least one client.

3. The method in claim 1, wherein the compressed or encoded audio is transmitted to the client, further comprising, transmitting the audio using broadcast to at least one client.

4. The method in claim 1, wherein the compressed or encoded audio is transmitted to the client, further comprising, transmitting the audio using unicast.

5. The method in claim 1, wherein audio of the interactive application is processed, further comprising, simulating audio effect and/or performing audio mixing on one or multiple virtual audio buffers.

6. The method in claim 5, further comprising, reading the audio rendered on the virtual audio buffer, and compressing and/or encoding the audio into audio stream by at least one audio compression component.

7. The method in claim 1 wherein an interactive application host executes an interactive application, further comprising, executing a virtual machine by the interactive application host, and running said interactive application inside said virtual machine.

8. The method in claim 1, further comprising, capturing audio command and/or audio data by a dummy audio driver.

9. The method in claim 1, further comprising, capturing audio command and/or audio data by an emulator.

10. The method in claim 1, further comprising, storing audio data in at least one audio data cache of the audio rendering apparatus and sharing the audio data by multiple instances of interactive applications executed by the same or different interactive application hosts.

11. The method in claim 1, wherein transmitting audio rendering commands generated by the executed interactive application to an audio rendering apparatus, further comprising, transmitting the audio rendering commands and/or audio data from the interactive application host to the audio rendering apparatus via system-area-network.

12. The method in claim 1 wherein an audio rendering apparatus processes audio commands, further comprising, distributing audio commands of multiple interactive application instances by a control processing element to multiple audio processing elements wherein said audio processing elements are contained in the audio rendering apparatus and coupled with said control processing element using interconnect circuit.

13. An audio rendering apparatus for processing audio rendering of hosted interactive application of an interactive application host center, wherein the interactive application executed by at least one host of the interactive application host center is under the control of at least one client that along with an optional collection of other clients receives via broadband network, audio of the interactive application rendered by the audio rendering apparatus, said apparatus comprising, a plurality of audio processing elements wherein said audio processing elements can simultaneously process audio rendering commands of multiple interactive application instances, and produce digital audio outputs for said interactive application instances;

at least one audio simulation means wherein said audio simulation means is contained in the audio processing element and said audio simulation means can simulate audio effect;

at least one audio mixing wherein said audio mixing is contained in the audio processing element;

at least one control element;

at least one interconnect circuit coupling said control element with the plurality of audio processing elements;

an audio rendering workload dispatcher wherein said audio rendering workload dispatcher distributes received audio rendering workload from multiple interactive application instances to the plurality of audio processing elements integrated with the audio rendering apparatus wherein an audio processing element is assigned to process audio rendering commands from one interactive application instance;

at least one audio compression component wherein said audio compression component can compress audio output rendered by the audio processing component; and at least one storage device wherein said storage device is used for storing audio data by at least one audio processing element and the stored audio data can be accessed by at least one audio compression component.

14. The apparatus in claim 13, further comprising at least a DMA engine wherein said DMA engine integrates the audio compression component with the audio processing element.

15. The apparatus in claim 13, further comprising, at least one interconnect circuit, wherein said interconnect circuit couples an audio compression component with at least one audio processing element.

16. The apparatus in claim 13, further comprising, at least one networking/communication interface, wherein the audio rendering apparatus can communicate with at least one interactive application host via said networking/communication interface.

17. The apparatus in claim 13, wherein the audio rendering apparatus is integrated with a graphics rendering apparatus wherein the graphics rendering apparatus can render frames of interactive application executed by at least one interactive application host.

18. The method in claim 1 wherein an interactive application host executes an interactive application, further comprising, executing a plurality of emulation tasks wherein said emulation tasks emulate a plurality of game consoles and/or hardware platforms, and assigning interactive application instances to the emulated game consoles and/or hardware platforms.

19. The apparatus in claim 13, further comprising, at least one memory interface wherein said memory interface couples with at least one audio compression component and at least one audio processing element; and at least one random access memory coupling with said memory interface.

* * * * *